United States Patent
Ziegenfus

(10) Patent No.: US 11,722,396 B2
(45) Date of Patent: *Aug. 8, 2023

(54) NETWORK STRESS TEST

(71) Applicant: Hubbell Incorporated, Shelton, CT (US)

(72) Inventor: Scott Ziegenfus, Orlando, FL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,346

(22) Filed: Mar. 29, 2022

(65) Prior Publication Data

US 2022/0294721 A1 Sep. 15, 2022

Related U.S. Application Data

(63) Continuation of application No. 16/845,896, filed on Apr. 10, 2020, now Pat. No. 11,290,364.

(60) Provisional application No. 62/832,065, filed on Apr. 10, 2019.

(51) Int. Cl.
*H04L 43/50* (2022.01)
*H04L 43/062* (2022.01)
*H04L 43/067* (2022.01)
*G06F 11/36* (2006.01)
*H04L 43/16* (2022.01)
*H04L 67/01* (2022.01)

(52) U.S. Cl.
CPC .......... *H04L 43/50* (2013.01); *G06F 11/3688* (2013.01); *G06F 11/3692* (2013.01); *H04L 43/062* (2013.01); *H04L 43/067* (2013.01); *H04L 43/16* (2013.01); *H04L 67/01* (2022.05)

(58) Field of Classification Search
CPC .......... H04L 43/00–43/50; H04L 67/42; G06F 11/3672–11/3692
See application file for complete search history.

(56) References Cited

U.S. PATENT DOCUMENTS

| | | | |
|---|---|---|---|
| 6,324,492 B1 | 11/2001 | Rowe | |
| 6,598,056 B1 | 7/2003 | Hull et al. | |
| 7,746,887 B2 | 6/2010 | McFarland | |
| 10,103,961 B2* | 10/2018 | Michaud | H04L 41/046 |
| 10,187,222 B2* | 1/2019 | Whiting | H04L 12/1895 |
| 10,733,073 B1 | 8/2020 | Watts et al. | |
| 2005/0055441 A1 | 3/2005 | Nace et al. | |

(Continued)

OTHER PUBLICATIONS

PCT/US2020/027722 International Search Report and Written Opinion dated Aug. 3, 2020.

(Continued)

*Primary Examiner* — Clayton R Williams
(74) *Attorney, Agent, or Firm* — Robinson & Cole LLP

(57) ABSTRACT

A method of conducting a network stress test includes providing a first client in communication with a first server via a client-server relationship. The method also includes setting a first frequency as a set frequency. The method further includes sending a first request from the first client to the first server at the set frequency. Additionally, the method includes sending a first response from the first server to the first client. The method also includes measuring a first elapsed time between the first request and the first response, and comparing the first elapsed time to a communication threshold.

7 Claims, 5 Drawing Sheets

(56) References Cited

U.S. PATENT DOCUMENTS

| | | |
|---|---|---|
| 2007/0174461 A1* | 7/2007 | Reilly ................ H04L 67/1001 709/226 |
| 2009/0089320 A1 | 4/2009 | Tendler et al. |
| 2015/0039752 A1 | 2/2015 | Hague |
| 2017/0006111 A1 | 1/2017 | McCoy et al. |
| 2017/0046254 A1 | 2/2017 | Buege |

OTHER PUBLICATIONS

The extended European search report dated Nov. 28, 2022, by the European Patent Office in corresponding European Patent Application No. 20786952.0. (10 pages).

Anonymous, "Load Testing vs. Stress Testing: Load and Stress Testing Compared," Jan. 3, 2019. (6 pages).

* cited by examiner

NETWORK STRESS TEST

FIELD OF THE DISCLOSURE

The present disclosure relates to a network stress test for use in Building Automation and Control Networks (BACnet) Protocol or other similar protocol. The network stress test may identify a breaking point of a single device on the protocol.

BACKGROUND

Building Automation and Control Networks (BACnet) is a commonly used protocol standard for Building Management Systems (BMS) that allows for building automation and may be used with a variety of building sub-systems (e.g., HVAC, lighting, fire detection, security, etc.). BACnet allows different sub-systems made by different manufacturers to communicate with one another over a standardized network. This allows building owners to implement a wide range of sub-systems, and allows these sub-systems to interact with one another. This may be useful for energy management systems (e.g., turning on or off the HVAC system based on an occupancy sensor in a light system).

Protocols like BACnet generally utilize a client-server software model in order to communicate between the different building sub-systems. Some sub-systems (e.g., HVAC) have a large memories, and request data from or poll other sub-systems (e.g., lighting), which may have smaller memories. The client is the sub-system requesting the data, and the server is the sub-system providing the data. From the server's prospective, the client-server relationship may be one-to-one (e.g., there is one client requesting data from an individual server), or the client-server relationship may be many-to-one (e.g., there are multiple clients requesting data from the individual server). Depending on the type of client (e.g., the individual building system) or the data required, different clients may poll the individual server at different rates.

The volume of clients and the speed at which each client polls places stress on the server. A combination of a large number of clients polling an individual server and individual clients polling too quickly may cause the server to lag, buffer, or fail. If this happens, the server may be unable to communicate with the client(s), and the client(s) may be unable to extract the requisite data they need. This may cause a system wide slowdown or failure across the entire building. This slowdown or failure may effect inhabitant discomfort and/or inhabitant safety.

SUMMARY

In one embodiment, a method of conducting a network stress test may include providing a first client in communication with a first server via a client-server relationship. The method may also include setting a first frequency as a set frequency. The method may further include sending a first request from the first client to the first server at the set frequency. Additionally, the method may include sending a first response from the first server to the first client. The method also includes measuring a first elapsed time between the first request and the first response, and comparing the first elapsed time to a communication threshold.

In another embodiment, a method of conducting a network stress test on a BACnet protocol may include providing a first client in communication with a first server via a client-server relationship. The method may also include providing a measurement system in communication with the first client and the first server. The method may further include sending a first request from the first client to the first server at the set frequency. Additionally, the method may include sending a first response from the first server to the first client. The method may also include measuring a first elapsed time between the first request and the first response with the measurement system, and displaying the first elapsed time.

In yet another embodiment, a method of determining performance degradation on a BACnet protocol may include providing a first client in communication with a first server via a client-server relationship, and providing a measurement system in communication with the first client and the first server. The method may also include repeatedly sending a first request from the first client to the first server at a set frequency, and sending a first response from the first server to the first client for each first request. Additionally, the method may include measuring a first elapsed time between each successive first request and first response, and measuring a second elapsed time between an initial request and a final response. The method may also include comparing the first elapsed time to a first threshold, and comparing the second elapsed time to a second threshold. Finally, the method may include increasing the set frequency when the second elapsed time exceeds the second threshold, and halting sending the first request from the first client to the first server at the set frequency when the first elapsed time exceeds the first threshold.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a network stress test for determining failure points in the BACnet Protocol. The network stress test may identify a maximum amount of traffic an individual device using the BACnet Protocol can withstand without causing a network failure.

Figure 1:
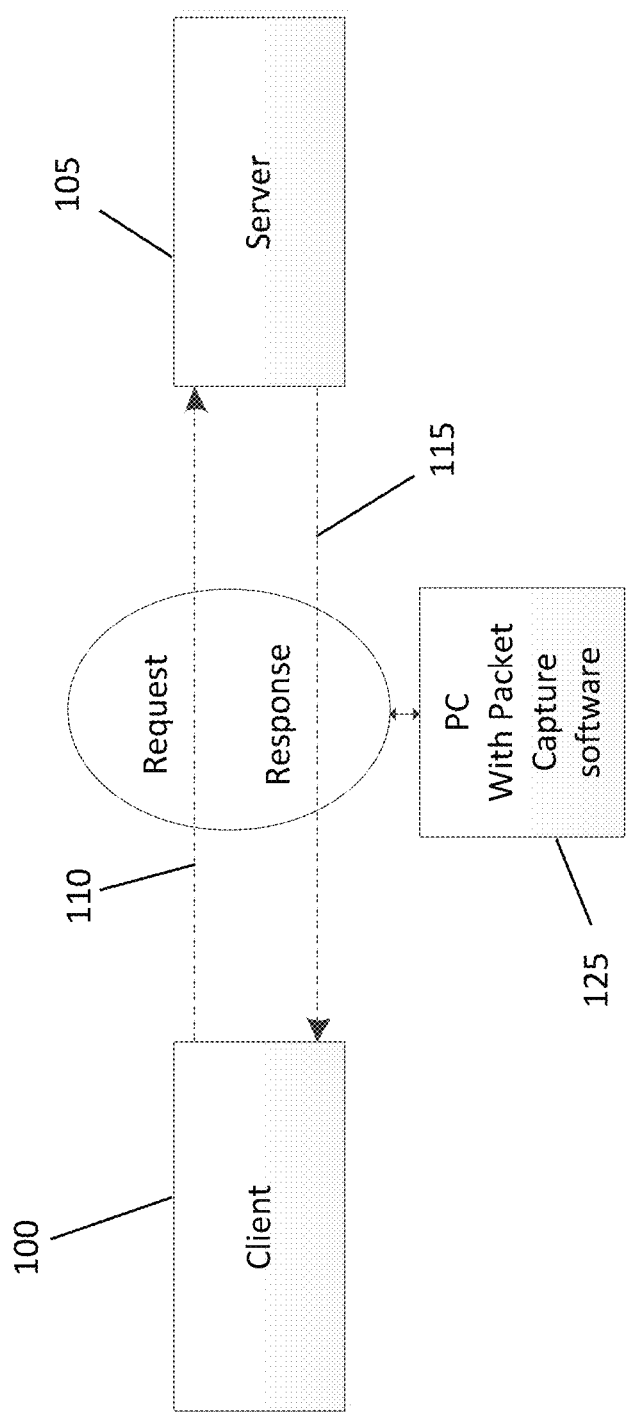
FIG. 1 depicts a schematic view of a single client system running on the BACnet protocol according to a number of embodiments.

As shown in FIG. 1, the BACnet protocol may be organized in a client-server relationship. The illustrated embodiment depicts a single client system 10 according to a number of embodiments. A client 100 may be a larger device or sub-system in the overall BMS. Clients 100 may have large internal memories or processors, and may be able to process large amounts of data. Through operation, the client 100 may produce and collect data that can be used in self-regulating the client 100 (e.g., changing an operating mode of the client 100). For example, an HVAC system may include a temperature sensor that controls if and when heating and cooling systems are turned on or off.

Clients 100 may also collect data from servers 105 concurrently running on the BACnet protocol. A server 105 may be a smaller device or sub-system in the overall BMS. Compared to clients 100, servers 105 have smaller internal memories or processors and may be unable to process the same volume of data as clients 100. Clients 100 may request data from servers 105 to further assist in regulation. For example an HVAC system may request data from a lighting fixture, and heat or cool a room based on a signal received from the lighting fixture (e.g., whether an occupancy sensor senses a person in a room).

To acquire the data from the server 105, the client 100 may send a request 110. By sending a request 110, the client 100 may be requesting a specific piece of information from the server 105 (e.g., whether the light fixture is on). The server 105 may answer a request 110 by sending a response 115 to a client 100. In some embodiments, the process of polling (i.e., sending requests 110 and responses 115 between clients 100 and servers 105) may be continuous at a given frequency $t_c$ (i.e., a number of requests 110 per minute) while the client 100 and the server 105 are on. In other embodiments, polling may take place at varying frequencies for a given client 100 and server 105.

Figure 2:
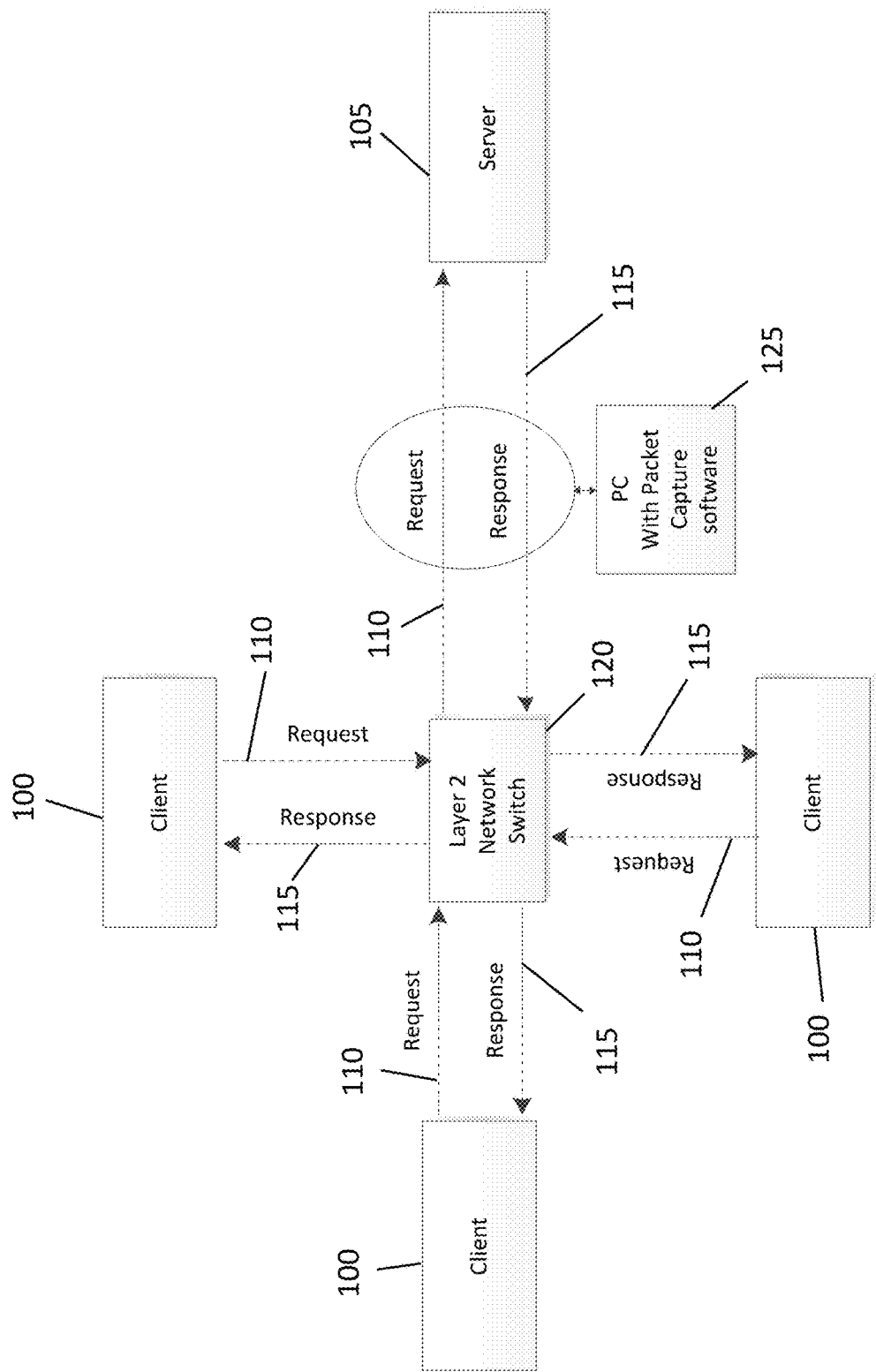
FIG. 2 depicts a schematic view of a multiple client system running on the BACnet protocol according to a number of embodiments.

As depicted in FIG. 2, a multiple client system 20 may include multiple clients 100 throughout the BACnet protocol that may be in communication with a single server 105. Each client 100 may make separate requests 110 to the server 105, and the server 105 may then answer each separate request 110. In some embodiments, each client 100 may make an identical, but separate request 110 (i.e., each client 100 requests the same piece of information). In other embodiments, some clients 100 may make unique requests 110 from other clients 100 (i.e., each client 100 asks for different pieces of information). Individual requests 110 may each be made at a constant time interval (e.g., the time $t_c$ for every client 100 may be the same). Each client 100 may also make requests 110 at different time intervals (e.g., the time $t_c$ for some clients 100 may be different).

To control the volume of data reaching the server 105, a switch 120 (e.g., a layer 2 network switch) may be positioned between the clients 100 and the server 105. The switch 120 may allow only a certain number of clients 100 to make a request 110 at a time, by allowing only a certain number of requests 110 to proceed to the server 105. In such a case, the switch 120 may block all requests 110 over the certain number from reaching the server 105 until the current certain number of requests 110 have been resolved (e.g., with a response 115).

In both the single client system 10 (see e.g., FIG. 1) and the multiple client system 20 (see e.g., FIG. 2), a point may exist at which the server 105 is unable to provide a suitable response 115 to the request 110 from the client 100 (e.g., a elapsed or response time $t_{res}$ between the request 110 and the response 115 exceeds a user defined communication threshold). In the multiple client system 20, a threshold of acceptable elapsed times $t_{res}$ between a request 110 and a response 115 may differ between different clients 110 (e.g., in some clients 100 the response time $t_{res}$ may be critical, while in other clients 100 the response time may not be critical). The communication threshold in the multiple client system 20 may therefore be linked to the most critical client 100 (e.g., the client with the fastest required response time $t_{res}$ may, as a practical matter, may set the response time requirements for the server). For example, clients 100 responsible for life safety functions may require a more timely response time $t_{res}$ than clients 100 not responsible for life safety functions.

Understanding how and when the response time $t_{res}$ the communication threshold is important, particularly to manufacturers of BACnet servers 105. Manufacturers need to understand what polling frequency $t_c$ and how many clients 100 may cause performance degradation (i.e., exceeding the communication threshold) for their server 105.

As shown in FIGS. 1 and 2, capture software 125 may be incorporated into the network. The capture software 125 may record requests 110 by the client 100, as well as responses 115 by the servers 105. The capture software 125 may record the type of request 110 and response 115 (e.g., what the client 100 is asking for and what the server 105 provides). The capture software 125 may also record elapsed time $t_{res}$ a request 110 and a response 115. In some cases, this record of requests 110 and responses 115 may be downloadable or shareable over a centralized network. In the multiple client system 20, capture software 125 may be positioned between the switch 120 and the server 105, and may record the requests 110 and the responses 115 to and from the server 105. Records from the capture software 125 may allow a user to analyze different time intervals for responses 115 across different types of requests 110.

Figure 3:
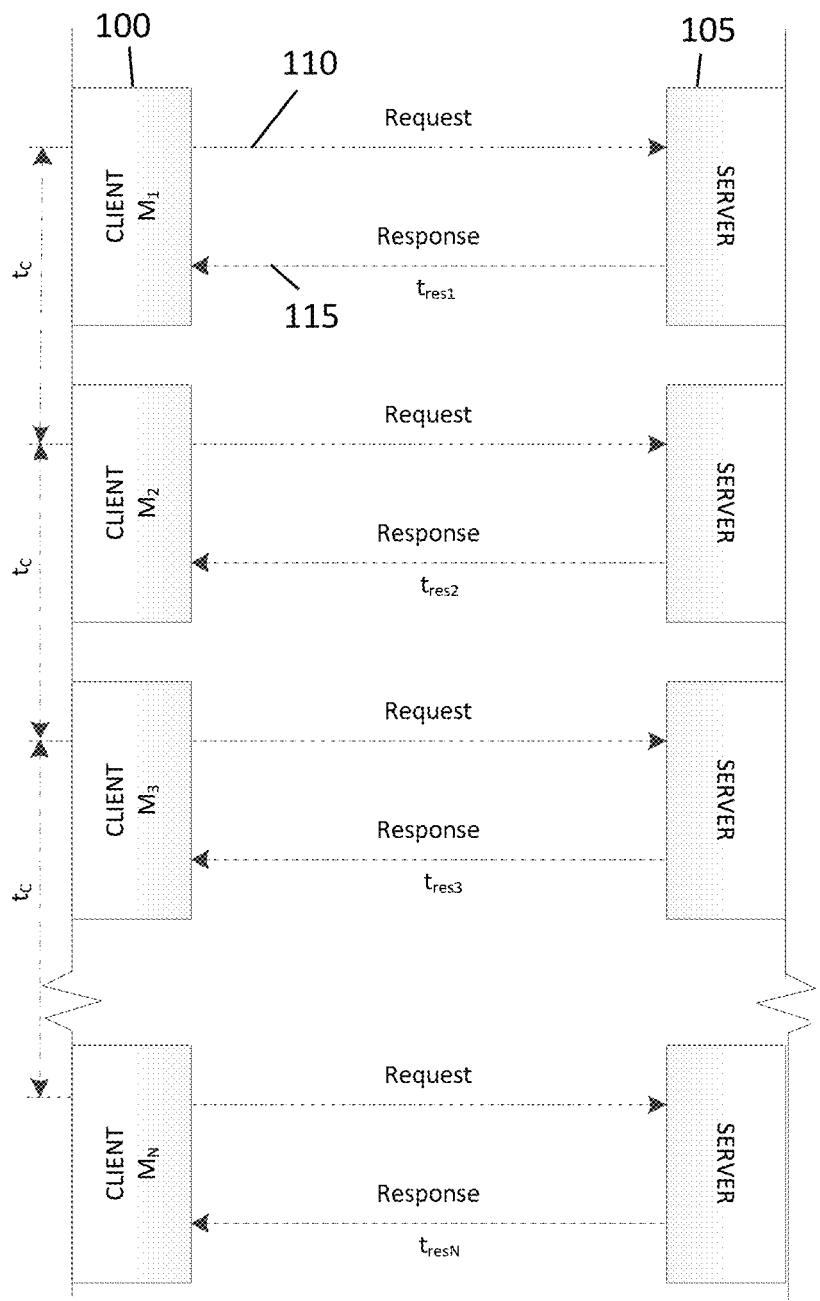
FIG. 3 depicts a schematic view of a message testing flow according to a number of embodiments.

As depicted in FIG. 3, a client 100 may send multiple messages M to a server 105 via a request 110. In some embodiments, each message M may be the same (e.g., the client 100 may be requesting the same piece of information), while in other embodiments, different messages M may request a different piece of information. After receiving the message M, the server 105 may send the client 100 a response 115 with in a response time $t_{res}$. The client 100 may then proceed to send the next message M (e.g., request the same or different pieces of information) after a defined rate $t_c$ has elapsed. This defined rate $t_c$ may be the polling rate for the given client 100. The network stress test may measure whether the server 105 has a response time $t_{res}$ is less than the polling frequency $t_c$. In a multiple client system 20, the network stress test may measure whether the server 105 has a response time $t_{res}$ for all requests 110 that is less than the polling frequency $t_c$ of the most critical client 100. This information may be important to determine if a user does not want the server 105 to get backed up and thereby become potentially unable to timely respond 115 to requests 110.

Figure 4:
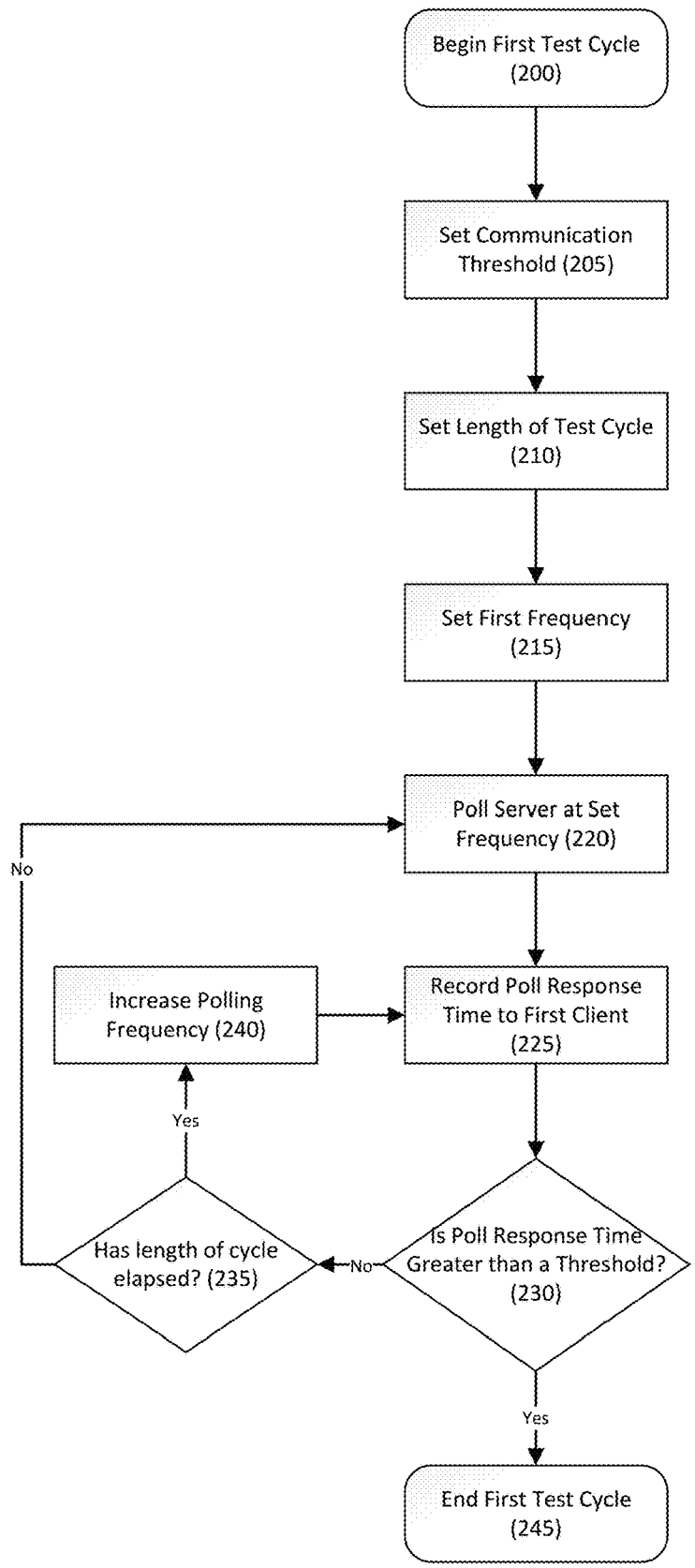
FIG. 4 depicts a flow diagram of a first test cycle which may be used with the single client system embodiments depicted in FIG. 1.

As depicted in FIG. 4, a first polling or test cycle may be used with the single client system 10 and the capture software 125 in order to determine when a communication threshold is reached. To start the first test cycle 200, a first determination as to what the communication threshold is 205 for the given client 100 (e.g., determining the slowest acceptable response time $t_{res}$ for the particular client 100), as well as a test threshold or the total length of the test 210 (e.g., one hour). A first frequency 215 (e.g., a minimum or slowest frequency) may also be established. In a number of embodiments, the first frequency $t_c$ may be one request 110 every 10 minutes. In other embodiments, the first frequency $t_c$ may be more or less than one request 110 every 10 minutes. The first test cycle may be initiated by polling the server 105 at the first frequency 220. It is contemplated herein that a user or machine may establish a frequency or a response time.

After receiving the request 110, the server 105 may give a response 115, which may be recorded 225 by the capture software 125. The capture software 125 may then compare the response time $t_{res}$ to the established communication threshold 230. If the response time is less than the threshold (e.g., if the response time $t_{res}$ faster than the slowest allowable response time is established by the communication threshold 205), the capture software 125 may then check, within the first cycle, how long the client has been polling at the current frequency 235. If that elapsed time is less (i.e., faster) than the set length of the test, then the client may resume polling at the set frequency 220 (e.g., the first frequency $t_c$).

If the response time $t_{res}$ less than the threshold and the first test has elapsed (e.g., is one hour has elapsed), the the polling frequency 240 is increased, and resumes polling the server 105 at the new frequency $t_c$. Each time the test elapses without reaching the communication threshold, increases to the polling frequency 240 may be made. In a number of embodiments, the polling frequency $t_c$ may be increased in defined increments (e.g., from one request 110 every 10 minutes to one request 110 every 0.001 ms). In other embodiments, the polling frequency $t_c$ may be increased between one request every 10 minutes to one request 110 every 0.001 seconds with a minimum of six steps (e.g., one message every 10 minutes, 1 minutes, 10 seconds, 1 second, 0.1 seconds, 0.01 seconds, and 0.001 seconds).

If the poll response time $t_{res}$ is greater than the established communication threshold 230, then the first test cycle ends 245. The capture software 125 may record when the server was unable to respond under the communication threshold. This may allow a user or machine to see how long into a test and at what frequency the server was unable to respond under the communication threshold.

Figure 5:
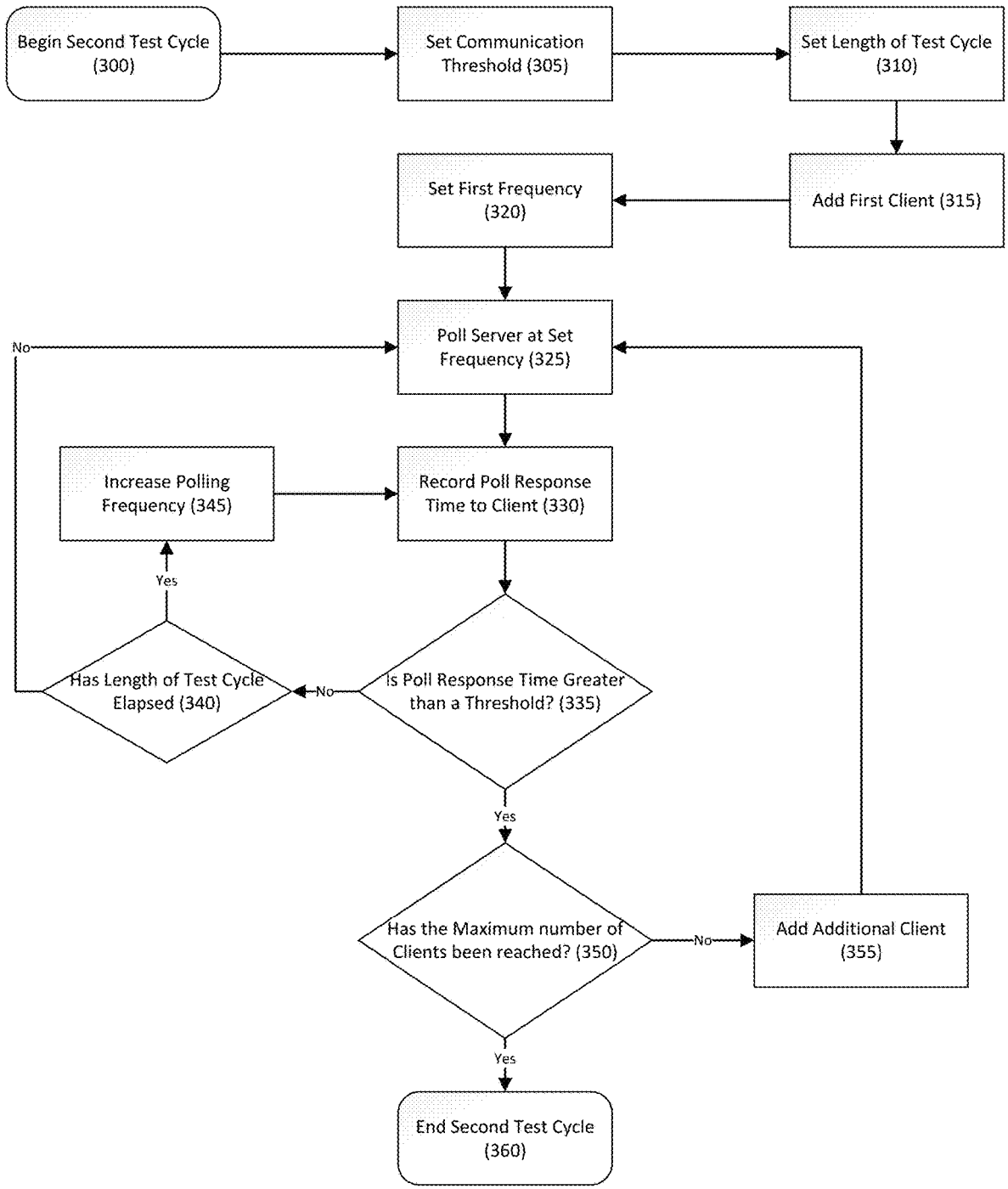
FIG. 5 depicts a flow diagram of a second test cycle which may be used with the multiple client system embodiments depicted in FIG. 2.

As shown in FIG. 5, a second polling or test cycle may be used with the multiple client system 20 and the capture software 125 in order to determine when a communication threshold is reached. To start the second test cycle 300, the communication threshold 305 may be determined for the given set of clients 100 (e.g., determining the slowest acceptable response time $t_{res}$ for the most critical client 100), as well as a test threshold or the total length of the test 310 (e.g., one hour). A first client may subsequently added in communication with the server 315, and a first frequency 320 may be established (e.g., a minimum or slowest frequency). In a number of embodiments, the first frequency $t_c$ may be one request 110 every 10 minutes. In other embodiments, the first frequency $t_c$ may be more or less than one request 110 every 10 minutes. A second test cycle may be subsequently initiated by polling the server 105 at the first frequency 325.

After receiving the request 110, the server 105 may give a response 115, all of which may be recorded 330 by the capture software 125. The capture software 125 may then compare the response time $t_{res}$ to the established communication threshold 335. If the response time $t_{res}$ is less than the threshold (e.g., the response time $t_{res}$ faster than the slowest allowable response is time established by the communication threshold 305), a check of how long the client has been polling at the current frequency 340 may performed. If that elapsed time $t_{res}$ less (i.e., faster) is than the set length of the test, the client may resume polling at the set frequency 325 (e.g., the first frequency $t_c$).

If the response time $t_{res}$ is less than the threshold and the first test has elapsed (e.g., one hour has elapsed), the polling frequency 345 may be increased, and resumes polling the server 105 may resume at the new frequency $t_c$. Each time the test elapses without reaching the communication threshold, the polling frequency 345 may be increased. In a number of embodiments, the polling frequency may be increased in defined increments (e.g., from one request 110 every 10 minutes to one request 110 every 0.001 ms). In other embodiments, the polling frequency may be increased between one request every 10 minutes to one request 110 every 0.001 seconds with a minimum of six steps (e.g., one message every 10 minutes, 1 minutes, 10 seconds, 1 second, 0.1 seconds, 0.01 seconds, and 0.001 seconds).

If the poll response time $t_{res}$ greater than the established communication threshold 335, the capture software may then check to see if the maximum number of clients for the given cycle have been reached 350. If not, one additional client 355 may be added and the test may be repeated, starting at the lowest frequency $t_c$ (e.g., one request per client every 10 minutes). The switch 120 may control which client 100 is allowed to communicate with the server 105 at a given time (e.g., the clients 100 may alternate between communicating and not communicating with the server 105). If a test is completed (e.g., the time has elapsed) and the threshold was not reached, the polling frequency 345 may be increased. If the communication threshold is reached prior to completing a test, an additional client 100 may be added 355, and the tests may be repeated. Once the final client is added 355 (e.g., the total number of clients 100 being used for the second test cycle is reached), and the communication threshold is reached, the second test cycle may end 360.

After completing a test cycle, the capture software 125 may be used to determine each point where the communication threshold was reached. In light of this data, manufacturers of BACnet servers 105 may change internal performance parameters within the server 105 to improve performance characteristics (e.g., increase the frequency at which the server 105 will be unable to meet the communication threshold). Manufacturers may also provide performance requirements to a specific BMS by giving the maximum number of clients 100 an individual server 105 are enabled to communicate with at a given frequency $t_c$.

It will be recognized by one of skill in the art that the methods and systems described herein are not only useful for network stress testing and preventing network faults, failures, or interruptions, but are also useful for optimizing network communications according to an administrator's desire. As a non-limiting example, a threshold or communication threshold described herein does not necessarily refer only to a point at which a network failure or fault may occur but may also refer to a communication goal selectively set or chosen by an administrator for the purpose of communication optimization such as but not limited to increasing average server response time across a network or calibrating as many clients as possible to communicate with a server. Further, it is contemplated herein that such selectively set or chosen communication thresholds may be chosen by a human administrator or by an autonomous machine administrator.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A system for conducting a network stress test, the system comprising:
   a first client;
   a first server that communicates with the first client via a client-server relationship; and
   a measurement system, including hardware, that communicates with the first client and the first server via a BACnet protocol, wherein the measurement system includes capture software that, when implemented, causes the measurement system to perform the steps of:
   determine a first threshold associated with the first client;
   determine that a first request was sent from the client to the first server based on the first threshold;
   determine that a first response was sent from the first server to the first client;
   measure a first elapsed time between the first request and the first response;
   compare the first elapsed time to the first threshold; and
   perform, based at least upon the comparison of the first elapsed time to the first threshold, a communication control.

2. The system of claim 1, wherein the first threshold is a first frequency.

3. The system of claim 1, wherein the communication control is one of increasing the first threshold from a first frequency to a second frequency and halting the sending of the first request from the first client to the first server based on the first threshold.

4. The system of claim 3, wherein increasing the first frequency to a second frequency is performed in response to the first elapsed time being less than the first threshold.

5. The system of claim 3, wherein halting the sending of the first request from the first client to the first server based on the first threshold is performed in response to the first elapsed time being greater than the first threshold.

6. The system of claim 1, wherein the capture software, when implemented, further causes the measurement system to send a second request to the first server at the set frequency.

7. The system of claim 6, wherein the capture software, when implemented, further causes the measurement system to measure a second elapsed time between the sending of the second request and a completion by the server of sending a second response to a second client that communicates with the first server.

* * * * *